US009712715B2

(12) United States Patent
Tsutsumi

(10) Patent No.: US 9,712,715 B2
(45) Date of Patent: Jul. 18, 2017

(54) PRINTING CONTROL SYSTEM AND PRINTING CONTROL METHOD THAT DETERMINE WHETHER OR NOT TO TRANSMIT PRINT JOB BASED ON DOCUMENT INFORMATION TO IMAGE FORMING APPARATUS CORRESPONDING TO LOCATION INFORMATION OF MOBILE TERMINAL IN ACCORDANCE WITH APPROVAL STATUS OF DOCUMENT INFORMATION

(71) Applicant: KYOCERA Document Solutions Inc., Osaka (JP)

(72) Inventor: Masafumi Tsutsumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/138,934

(22) Filed: Apr. 26, 2016

(65) Prior Publication Data
US 2016/0323478 A1 Nov. 3, 2016

(30) Foreign Application Priority Data

Apr. 28, 2015 (JP) ................................ 2015-092141

(51) Int. Cl.
*H04N 1/32* (2006.01)
*H04N 1/00* (2006.01)
(52) U.S. Cl.
CPC ..... *H04N 1/32101* (2013.01); *H04N 1/00244* (2013.01); *H04N 1/00307* (2013.01); *H04N 2201/0094* (2013.01)

(58) Field of Classification Search
CPC .......... H04N 1/32101; H04N 1/00244; H04N 1/00307
(Continued)

(56) References Cited

U.S. PATENT DOCUMENTS

2003/0002078 A1* 1/2003 Toda .................... G06F 3/1205
358/1.15
2005/0270569 A1* 12/2005 Hayashi ............. H04N 1/00204
358/1.15
(Continued)

FOREIGN PATENT DOCUMENTS

JP 2007-148532 A 6/2007

*Primary Examiner* — Jamares Q Washington
(74) *Attorney, Agent, or Firm* — Studebaker & Brackett PC

(57) ABSTRACT

A printing control system includes a server, an approver terminal, an image forming apparatus, and a mobile terminal. The server includes a printing determination section and a storage section that stores therein document information. Upon output request information and location information being transmitted from the mobile terminal to the server via the image forming apparatus corresponding to the location information, the printing determination section determines whether or not to transmit a print job to the image forming apparatus in accordance with an approval status of the document information. The approval status varies depending on presence or absence of transmission of content approval information approving content of the document information from the approver terminal to the server and depending on presence or absence of transmission of output approval information approving output conditions for output of an image based on the document information from the approver terminal to the server.

11 Claims, 11 Drawing Sheets

(58) Field of Classification Search
USPC ..... 358/1.15, 1.14, 1.18, 405; 709/203, 225, 709/239, 238
See application file for complete search history.

(56) References Cited

U.S. PATENT DOCUMENTS

2006/0012828 A1* 1/2006 Ohta .................... H04W 48/00
                                                358/1.18
2009/0174895 A1* 7/2009 Huster ................. G06F 3/1207
                                                358/1.15

* cited by examiner

PRINTING CONTROL SYSTEM AND PRINTING CONTROL METHOD THAT DETERMINE WHETHER OR NOT TO TRANSMIT PRINT JOB BASED ON DOCUMENT INFORMATION TO IMAGE FORMING APPARATUS CORRESPONDING TO LOCATION INFORMATION OF MOBILE TERMINAL IN ACCORDANCE WITH APPROVAL STATUS OF DOCUMENT INFORMATION

INCORPORATION BY REFERENCE

The present application claims priority under 35 U.S.C. §119 to Japanese Patent Application No. 2015-092141, filed on Apr. 28, 2015. The contents of this application are incorporated herein by reference in their entirety.

BACKGROUND

The present disclosure relates to a printing control system, a server, and a printing control method.

Some printing control systems are capable of outputting from a printer an image based on document information stored in a server through operation of a mobile terminal. Such printing control systems include a printing control system having a printing control device governing permission or denial of printing by a printer according to location information of the mobile terminal. A user of the printing control system can output an image based on the document information from a specific printer by transmitting a printing instruction and location information from a mobile terminal located in a specific area to the printing control device.

SUMMARY

A printing control system according to an aspect of the present disclosure controls printing on a recording medium. The printing control system includes a server, an approver terminal, an image forming apparatus, and a mobile terminal. The approver terminal is communicable with the server. The image forming apparatus is communicable with the server. The mobile terminal is communicable with the image forming apparatus. The server includes a storage section and a printing determination section. The storage section stores therein document information. The mobile terminal transmits output request information and location information to the server via the image forming apparatus. The output request information includes information requesting the server to transmit a print job based on the document information. The location information includes information indicating a location of the mobile terminal. Upon the output request information and the location information being transmitted from the mobile terminal to the server via the image forming apparatus, the printing determination section determines whether or not to transmit the print job to the image forming apparatus corresponding to the location information in accordance with an approval status of the document information. The approval status varies depending on presence or absence of transmission of content approval information from the approver terminal to the server and depending on presence or absence of transmission of output approval information from the approver terminal to the server. The content approval information approves content of the document information. The output approval information approves output conditions for output of an image based on the document information.

A server according to an aspect of the present disclosure is communicable with an approver terminal and with an image forming apparatus. The server includes a storage section and a printing determination section. The storage section stores therein document information. The printing determination section determines, upon the server receiving output request information and location information, whether or not to transmit a print job to the image forming apparatus corresponding to the location information in accordance with an approval status of the document information. The output request information requests the server to transmit the print job based on the document information. The location information indicates a location of a mobile terminal that has transmitted the output request information. The approval status varies depending on presence or absence of transmission of content approval information from the approver terminal to the server and depending on presence or absence of transmission of output approval information from the approver terminal to the server. The content approval information approves content of the document information. The output approval information approves output conditions for output of an image based on the document information.

A printing control method according to an aspect of the present disclosure is implemented by a server communicable with an approver terminal and with an image forming apparatus. The printing control method includes storing document information, receiving output request information and location information, and determining whether or not to transmit a print job. The storing document information involves the server storing the document information. The receiving output request information and location information involves the server receiving the output request information requesting the server to transmit the print job based on the document information and the location information indicating a location of a mobile terminal that has transmitted the output request information. The determining whether or not to transmit the print job involves, after the receiving of the output request information and the location information, the server determining whether or not to transmit the print job to the image forming apparatus corresponding to the location information in accordance with an approval status of the document information. The approval status varies depending on presence or absence of transmission of content approval information from the approver terminal to the server and depending on presence or absence of transmission of output approval information from the approver terminal to the server. The content approval information approves content of the document information. The output approval information approves output conditions for output of an image based on the document information.

DETAILED DESCRIPTION

Figure 1:
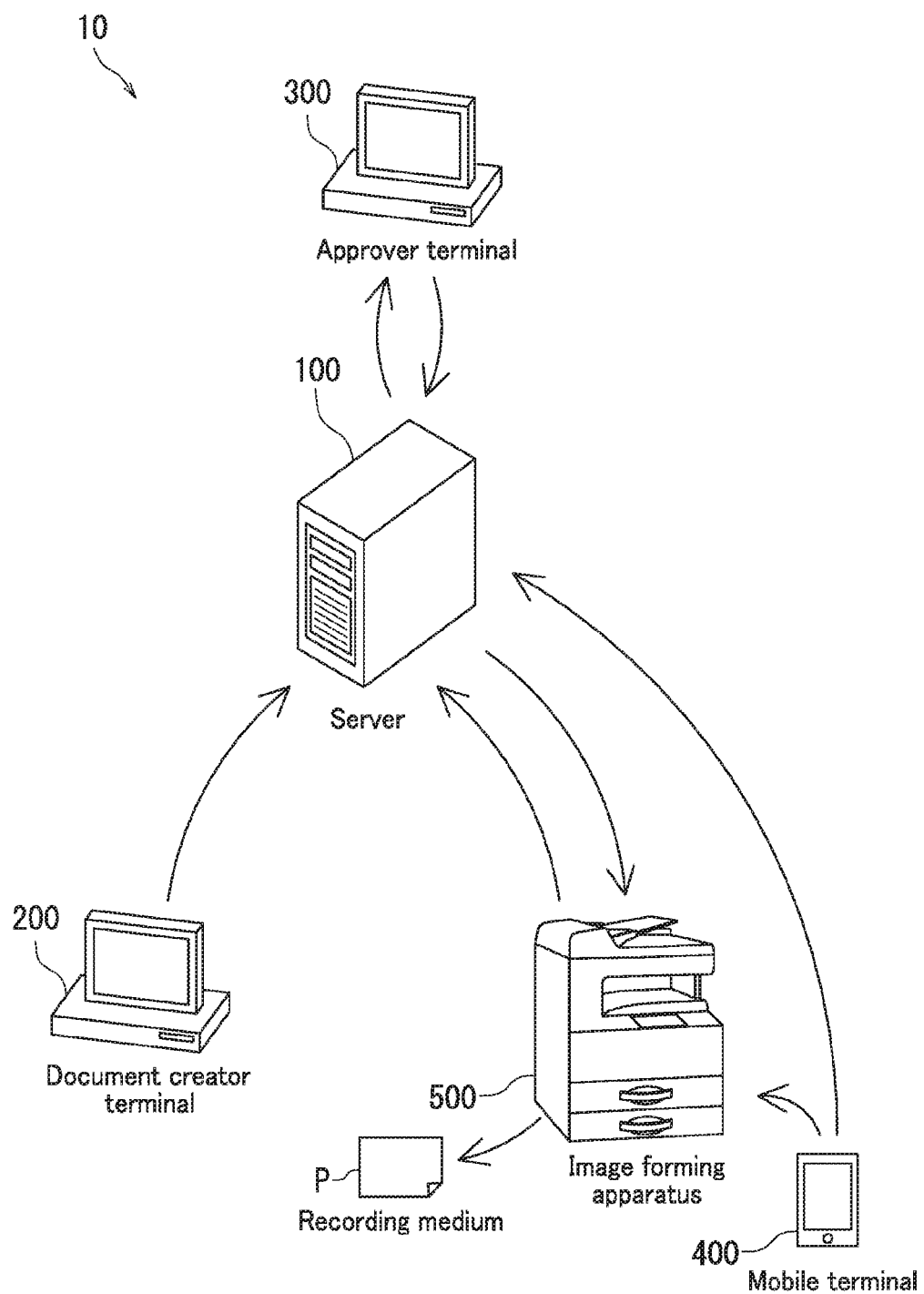
FIG. 1 is a diagram illustrating overview of a printing control system according to an embodiment of the present disclosure.

The following describes embodiments of the present disclosure with reference to the accompanying drawings. Note that in the drawings, elements that are the same or substantially equivalent are labelled using the same reference signs and description thereof is not repeated.

The following describes overall configuration of a printing control system 10 according to the present embodiment with reference to FIG. 1. FIG. 1 is a diagram illustrating overview of the printing control system 10. The printing control system 10 includes a server 100, a document creator terminal 200 communicable with the server 100, an approver terminal 300 communicable with the server 100, an image forming apparatus 500 communicable with the server 100, and a mobile terminal 400 communicable with the image forming apparatus 500.

More specifically, the server 100, the document creator terminal 200, the approver terminal 300, and the image forming apparatus 500 are communicatively connected to one another via a network. For example, each of these devices is communicatively connected to one another via the internet, a local area network (LAN), or a wide area network (WAN). The mobile terminal 400 is capable of short-distance wireless communication with the image forming apparatus 500. The short-distance wireless communication is for example in the form of BLUETOOTH (registered trademark). The mobile terminal 400 is also capable of communication with the server 100 using a virtual private network (VPN) without routing communications through the image forming apparatus 500.

Figure 2:
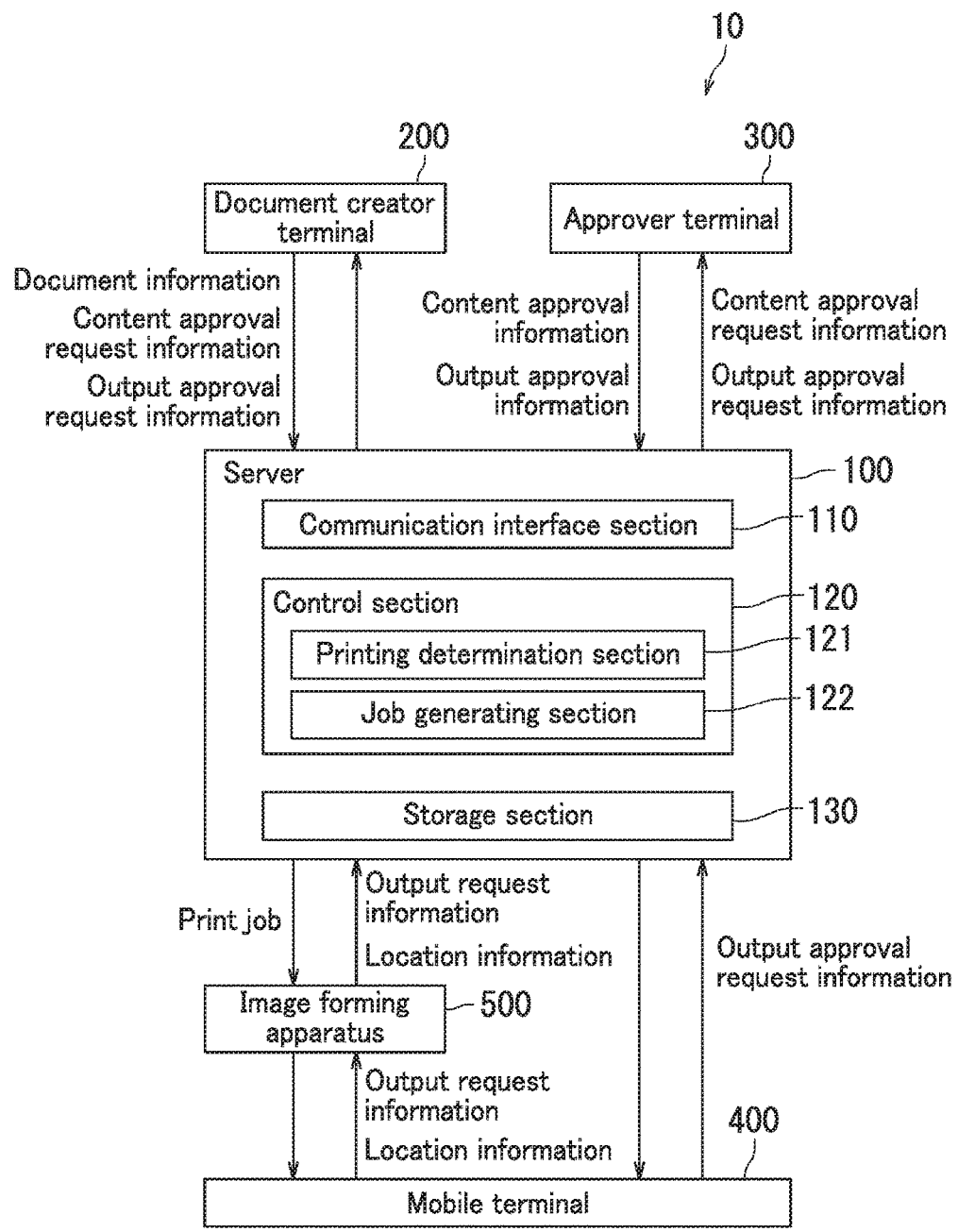
FIG. 2 is a block diagram illustrating part of configuration of the printing control system according to the embodiment of the present disclosure.

The following describes configuration of the server 100 in the printing control system 10 according to the present embodiment with reference to FIG. 2. FIG. 2 is a block diagram illustrating part of configuration of the printing control system 10. The server 100 includes a communication interface section 110, a control section 120, and a storage section 130. The server 100 includes a central processing unit (CPU), read only memory (ROM), random access memory (RAM), and a hard disk drive (HDD). The server 100 functions through the CPU executing a control program stored in the ROM or the HDD. The RAM is used as a work area during execution of the control program by the CPU.

The communication interface section 110 enables transmission and reception of various types of information to and from the document creator terminal 200, the approver terminal 300, the mobile terminal 400, and the image forming apparatus 500 in accordance with instructions from the control section 120. For example, the communication interface section 110 receives document information W, content approval request information N1, and output approval request information N2 transmitted from the document creator terminal 200.

The document information W is created by a document creator using any type of application software installed on the document creator terminal 200. Content of the document information W is for example a report, a conference material, or a draft thereof. The document information W is for example in the form of a Word file, an Excel file, or a Portable Document Format (PDF) file. The document information W is given an identifier identifying a document creator (for example, a document creator ID and an ID of a team to which the document creator belongs).

The content approval request information N1 includes information making a request for approval of the content of the document information W from the document creator to an approver. The output approval request information N2 includes information indicating output conditions for output of an image based on the document information W and information making a request for approval of the output conditions from the document creator to the approver. Hereinafter, output of an image based on the document information W is referred to simply as "output of the document information W". The document creator for example transmits the content approval request information N1 and the output approval request information N2 to the server 100 using application software.

The output conditions for output of the document information W include a condition specifying an installation place at which the document information W is to be output and for which approval is sought. The installation place is a place in which the image forming apparatus 500 is installed. The output conditions also include a condition specifying a time at which the document information W is to be output and for which approval is sought. The document creator determines the output conditions as appropriate. The installation place of the image forming apparatus 500 is specified as a name of an administrator that administers the installation place (for example, a section/department name or a company name). The installation place is associated with administrator information indicating the administrator name (indicating the administrator). The time at which the document information W is to be output is specified as a time of day or a period of day (for example, during operating hours or outside operating hours). The time is associated with time information indicating time.

The control section 120 includes a printing determination section 121 and a job generating section 122. The control section 120 stores in the storage section 130 the document information W, the content approval request information N1, and the output approval request information N2 received from the document creator terminal 200.

Furthermore, the control section 120 transmits the content approval request information N1 and the output approval request information N2 to the approver terminal 300 via the communication interface section 110. For example, the control section 120 transmits the content approval request information N1 and the output approval request information N2 to the approver terminal 300 using application software or an e-mail.

The control section 120 receives content approval information N3 and output approval information N4 transmitted thereto from the approver terminal 300 via the communication interface section 110. The content approval information N3 includes information indicating that the approver has checked the content approval request information N1 and approved the content of the document information W. The output approval information N4 includes information indicating that the approver has checked the output approval request information N2 and approved the output conditions for output of the document information W. The control section 120 stores the received content approval information N3 and output approval information N4 in the storage section 130.

The control section 120 also receives output request information N5 and location information N6 transmitted thereto from the image forming apparatus 500 via the communication interface section 110. More specifically, the output request information N5 and the location information N6 are transmitted from the mobile terminal 400 to the communication interface section 110 via the image forming apparatus 500 in response to a user's operation. The output request information N5 includes information requesting the server 100 to transmit a print job J based on the document information W. The location information N6 includes information indicating a location of the mobile terminal 400 that has transmitted the output request information N5. The control section 120 stores the received output request information N5 and output approval information N6 in the storage section 130.

The storage section 130 is non-volatile memory such as a HDD. The storage section 130 stores the document information W, the content approval request information N1, the output approval request information N2, the content approval information N3, the output approval information N4, the output request information N5, the location information N6, an identification information list, and information indicating restriction conditions.

The printing control system 10 may include a plurality of image forming apparatuses 500. The identification information list includes identification information for identifying each of the plurality of image forming apparatuses 500. A candidate image forming apparatus 500 to which the print job J is to be transmitted can be identified using the identification information. More specifically, the identification information includes location information (for example, latitude information and longitude information) indicating installation places of the image forming apparatuses 500 and administrator information indicating names of administrators (indicating administrators) that administer the installation places of the respective image forming apparatuses 500. Each of the installation places can be associated with administrator information indicating a different administrator name (indicating a different administrator) according to settings. An administrator is for example a team to which the document creator belongs, a section/department to which the team belongs, a division to which the section/department belongs, a company to which the division belongs, or a client company to which the document creator does not belong.

The restriction conditions specify an installation place of an image forming apparatus 500 to be permitted to output the document information W. For example, the restriction conditions specify the installation place of the image forming apparatus 500 to be permitted to output the document information W as a place administered by a team to which the document creator belongs. For another example, the restriction conditions specify the installation place of the image forming apparatus 500 to be permitted to output the document information W as a place administered by all the administrators including the client company. Hereinafter, an image forming apparatus 500 installed in a place administered by a team or the like to which the document creator belongs is referred to simply as "an image forming apparatus 500 of a document creator's team or the like". Setting up the restriction conditions enhance security for management of the document information W.

The restriction conditions can also specify a time at which the document information W is permitted to be output. The restriction conditions for example specify the time as a specific time of day, a specific period of day, a specific day of week, or any time of day. For another example, the restriction conditions may specify the time as "within three minutes from transmission of the output request information N5 from the mobile terminal 400 to the image forming apparatus 500". By doing so, paper on which the document information W has been recorded is prevented from being stolen by someone other than the user who has operated the mobile terminal 400 and requested the output. The security can be thus enhanced.

Upon the output request information N5 and the location information N6 being transmitted from an image forming apparatus 500 to the communication interface section 110, the printing determination section 121 determines whether or not to transmit the print job J to an image forming apparatus 500 corresponding to the location information N6 in accordance with an approval status of the document information W. The image forming apparatus 500 corresponding to the location information N6 is the image forming apparatus 500 that has received the location information N6 from the mobile terminal 400 and transmitted the location information N6 to the server 100.

The approval status varies depending on presence or absence of transmission of the content approval information N3 from the approver terminal 300 to the server 100 and depending on presence or absence of transmission of the output approval information N4 from the approver terminal 300 to the server 100. That is, the approval status in a situation in which the approver terminal 300 has transmitted both the content approval information N3 and the output approval information N4 to the server 100, the approval status in a situation in which the approver terminal 300 has transmitted only one of the content approval information N3 and the output approval information N4 to the server 100, and the approval status in a situation in which the approver terminal 300 has transmitted neither the content approval information N3 nor the output approval information N4 are different from one another. Hereinafter, the "situation in which the approver terminal 300 has transmitted both the content approval information N3 and the output approval information N4 to the server 100" is described as "content and output approved". Likewise, the "situation in which the approver terminal 300 has transmitted only the content approval information N3 to the server 100" is described as "only content approved". The "situation in which the approver terminal 300 has transmitted only the output approval information N4 to the server 100" is described as "only output approved". The "situation in which the approver terminal 300 has transmitted neither the content approval information N3 nor the output approval information N4 to the server 100" is described as "content and output unapproved". The situations representing such approval statuses are prestored in the storage section 130.

The printing determination section 121 determines to transmit the print job J to an image forming apparatus 500 according to the conditions included in the output conditions when the approval status is "content and output approved". For example, in a situation in which the output conditions include "image forming apparatus 500 of the document creator's company" and "any time of day", the printing determination section 121 determines to permit an image forming apparatus 500 to output the document information W any time of day on the condition that the image forming apparatus 500 is an image forming apparatus 500 of the document creator's company.

For another example, in a situation in which the approver terminal 300 has not transmitted at least one of the content approval information N3 and the output approval information N4 to the server 100, the printing determination section 121 determines to transmit the print job J to an image forming apparatus 500 in an installation place different from the installation place specified by the output conditions. That is, even when the approval status is "only content approved", "only output approved", or "content and output unapproved", the printing determination section 121 determines to permit an image forming apparatus 500 to output the document information W on the condition that the image forming apparatus 500 is installed in a place specified by the restriction conditions set up for the respective approval statuses. Thus, the user can adjust the degree of enhancement of the security according to the approval status. The user can therefore output the document information W from an image forming apparatus 500 specified by the restriction conditions even if the approval status with respect to the desired output conditions is not "content and output approved".

For example, when the approval status is "only content approved", the printing determination section 121 determines to permit an image forming apparatus 500 to output the document information W on the condition that the image forming apparatus 500 is an image forming apparatus 500 of the document creator's section/department. For another example, when the approval status is "only output approved", the printing determination section 121 determines to permit an image forming apparatus 500 to output the document information W on the condition that the image forming apparatus 500 is an image forming apparatus 500 of the document creator's division. For another example, when the approval status is "content and output unapproved", the printing determination section 121 determines to permit an image forming apparatus 500 to output the document information W on the condition that the image forming apparatus 500 is an image forming apparatus 500 of the document creator's team.

The printing determination section 121 notifies a determination result to the job generating section 122. In accordance with the determination result, the job generating section 122 generates the print job J based on the document information W. The job generating section 122 transmits the print job J to the permitted image forming apparatus 500 via the communication interface section 110.

Figure 3:
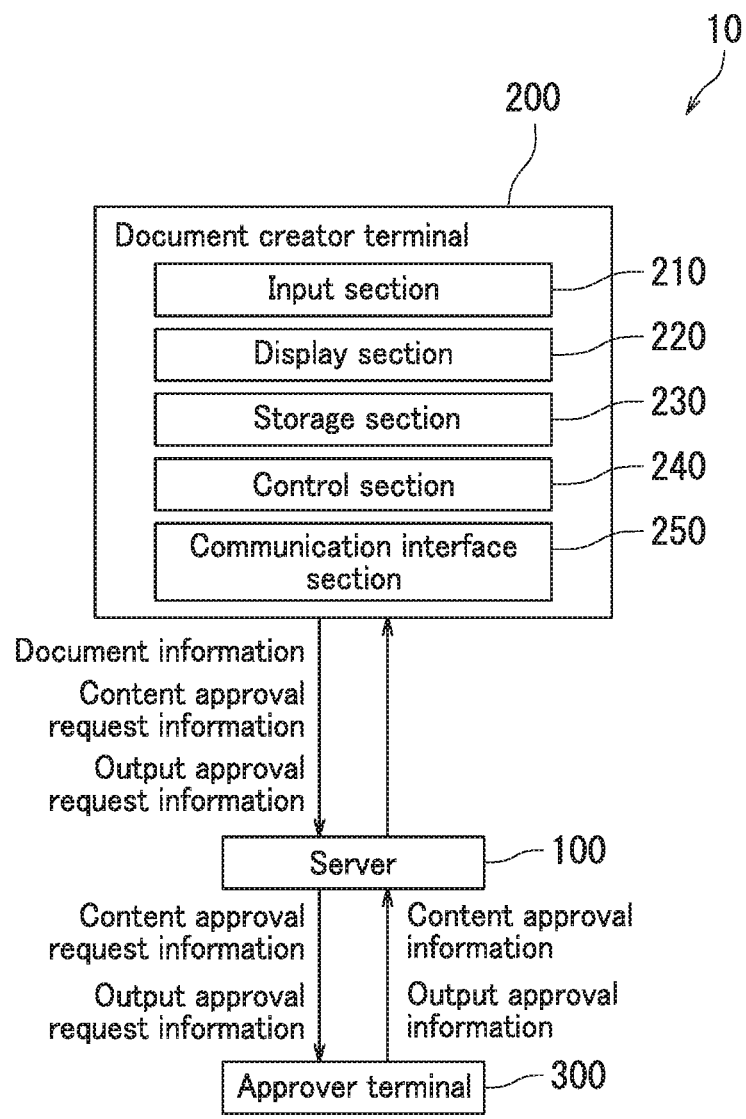
FIG. 3 is a block diagram illustrating part of configuration of the printing control system according to the embodiment of the present disclosure.

The following describes configuration of the document creator terminal 200 in the printing control system 10 according to the present embodiment with reference to FIG. 3. FIG. 3 is a block diagram illustrating part of configuration of the printing control system 10. The document creator terminal 200 includes an input section 210 operable by a user, a display section 220, a storage section 230, a control section 240, and a communication interface section 250. The document creator terminal 200 is for example a personal computer. The document creator terminal 200 is operated by a document creator. The document creator is for example an employee of a company.

Like the server 100, the document creator terminal 200 includes a CPU, ROM, RAM, and a HDD. The document creator terminal 200 operates through the CPU executing various programs including an operating system (OS). The various programs are stored in the ROM or the HDD. The HDD for example stores a printer driver and application software for implementing document creation or spreadsheets.

The input section 210 and the display section 220 function as a user interface. The input section 210 receives the document creator's operations. The input section 210 is for example a keyboard or a mouse. The document creator starts up application software through operation of the input section 210 to create the document information W. The display section 220 notifies various types of information to the document creator. The display section 220 is for example a liquid-crystal display. A touch panel may be used as integrated input section 210 and display section 220.

The storage section 230 is able to store various types of data. The storage section 230 is non-volatile memory such as a HDD or flash memory. The storage section 230 stores the document information W.

The control section 240 transmits the document information W to the server 100 via the communication interface section 250 in response to the document creator's operation.

The document creator starts up application software through operation of the input section 210 to enter the content approval request information N1 and the output approval request information N2 in a specific form. The control section 240 transmits the content approval request information N1 and the output approval request information N2 to the approver terminal 300 via the server 100.

The communication interface section 250 enables transmission and reception of various types of information to and from the server 100 in accordance with instructions by the control section 240.

Figure 4:
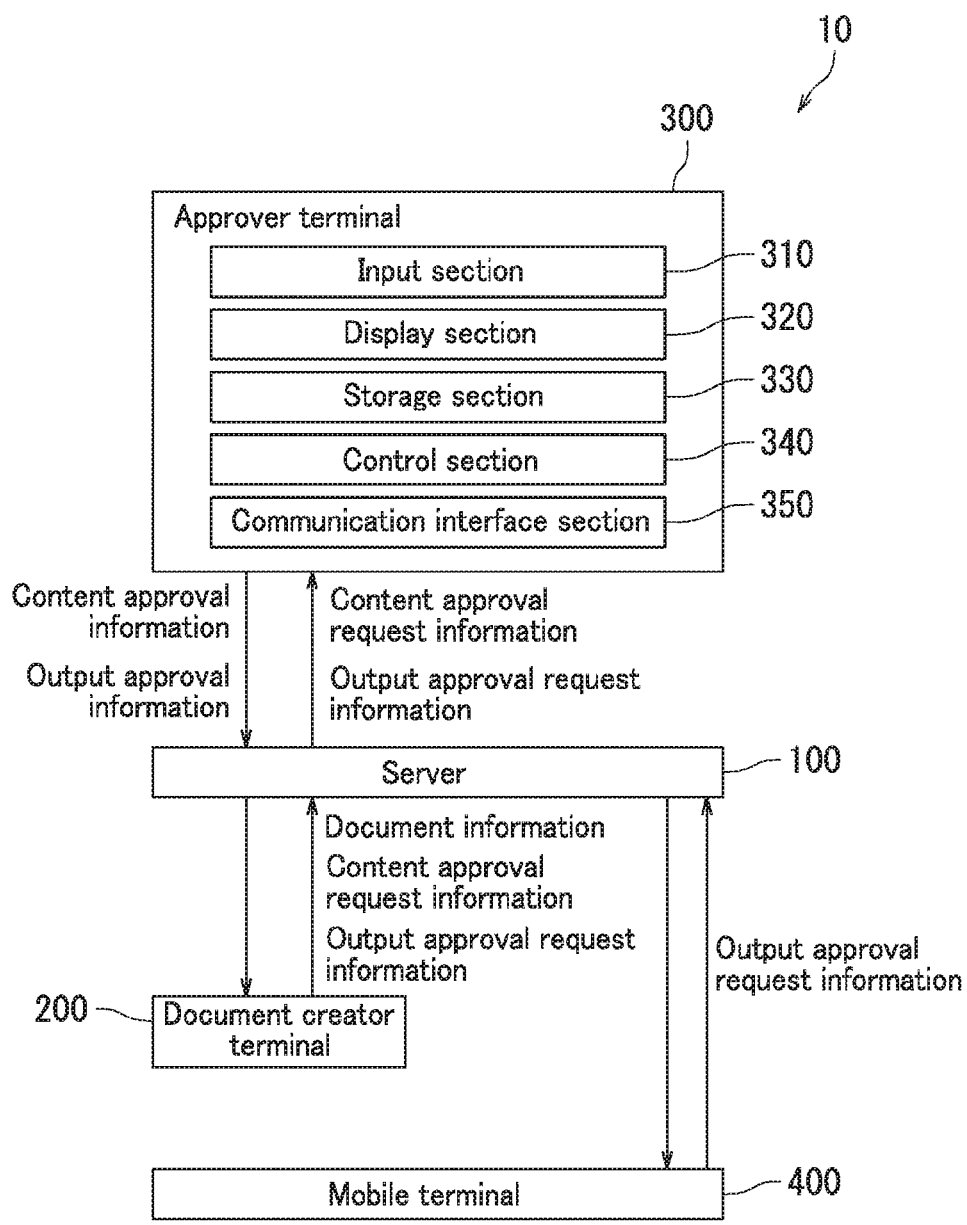
FIG. 4 is a block diagram illustrating part of configuration of the printing control system according to the embodiment of the present disclosure.

The following describes configuration of the approver terminal 300 in the printing control system 10 according to the present embodiment with reference to FIG. 4. FIG. 4 is a block diagram illustrating part of configuration of the printing control system 10. Like the document creator terminal 200, the approver terminal 300 includes an input section 310, a display section 320, a storage section 330, a control section 340, and a communication interface section 350. Like the document creator terminal 200, the approver terminal 300 includes a CPU, ROM, RAM, and a HDD. The approver terminal 300 operates through the CPU executing various programs including an operating system (OS). The approver terminal 300 is for example a personal computer.

The approver terminal 300 is operated by an approver. The approver is authorized to approve content and output of the document information W created by the document creator. The approver is for example the document creator's superior (for example, a section manager, a department manager, or a company president).

The control section 340 receives the content approval request information N1 and the output approval request information N2 transmitted thereto from the document creator terminal 200 via the server 100. The control section 340 stores the content approval request information N1 and the output approval request information N2 in the storage section 330.

The display section 320 functions as a notification section that notifies various types of information to the approver. The display section 320 for example notifies to the approver that approval of the content of the document information W has been requested and that approval of the output conditions has been requested.

After seeing the notification, the approver checks the content approval request information N1 and the output approval request information N2 stored in the storage section 330 of the approver terminal 300. The approver determines whether or not to approve the document information W depending on the propriety of the content of the document information W stored in the storage section 130 and depending on the propriety of the output conditions.

Thereafter, in response to the approver's operation, the control section 340 transmits the content approval information N3 for the content approval request information N1 and the output approval information N4 for the output approval request information N2 to the server 100. The content approval information N3 and the output approval information N4 are for example transmitted using application software or e-mails.

Figure 5:
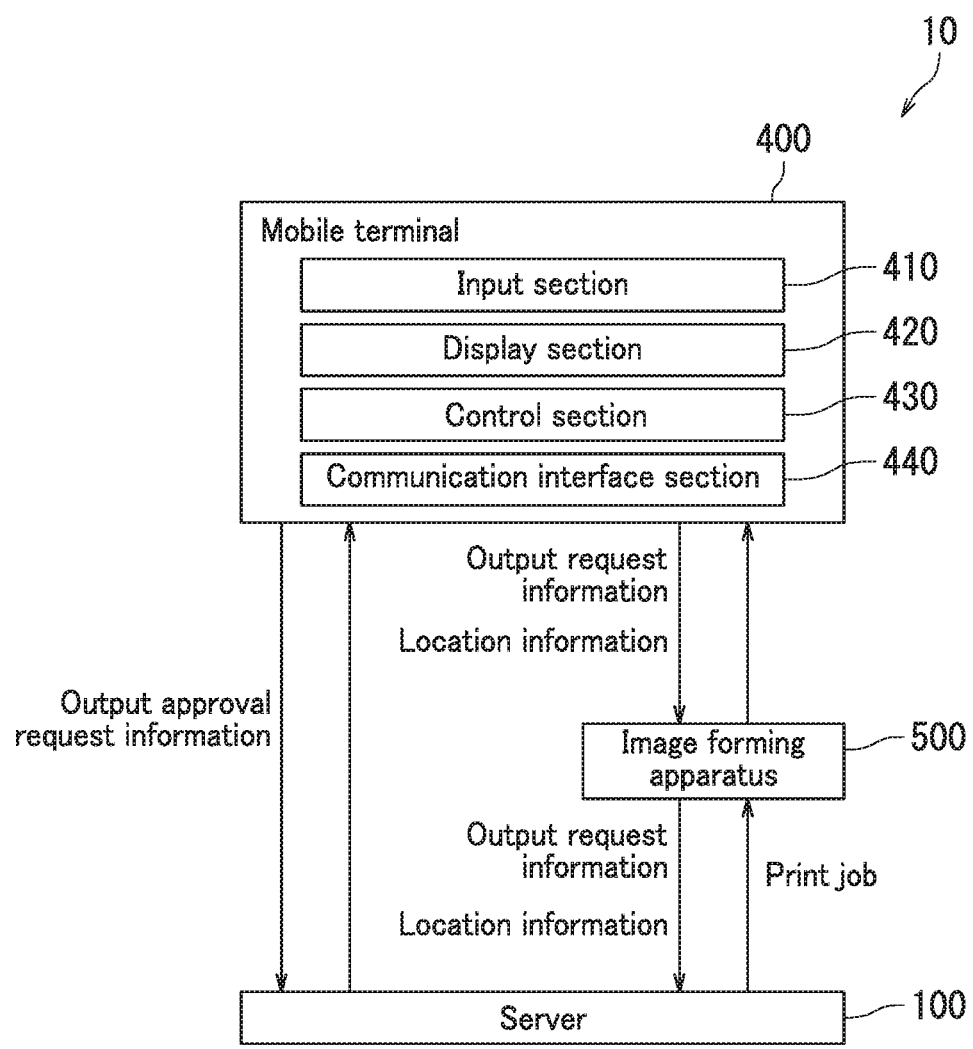
FIG. 5 is a block diagram illustrating part of configuration of the printing control system according to the embodiment of the present disclosure.

The following describes configuration of the mobile terminal 400 in the printing control system 10 according to the present embodiment with reference to FIG. 5. FIG. 5 is a block diagram illustrating part of configuration of the printing control system 10. Like the document creator terminal 200, the mobile terminal 400 includes an input section 410, a display section 420, a control section 430, and a communication interface section 440. Like the server 100, the mobile terminal 400 includes a CPU, ROM, RAM, and a HDD. The mobile terminal 400 functions through the CPU executing a control program stored in the ROM or the HDD. The mobile terminal 400 is for example a smartphone, a tablet terminal device, or a mobile phone.

The mobile terminal 400 is for example carried by the document creator or an employee requested by the document creator to perform printing of the document information W.

The communication interface section 440 enables transmission and reception of various types of information to and from the image forming apparatus 500 or the server 100 in accordance with instructions by the control section 430.

The document creator goes to an installation place of an image forming apparatus 500 and operates the input section 410 to cause the control section 430 to acquire the location information N6 of the mobile terminal 400. The control section 430 for example acquires the location information N6 via a global positioning system (GPS).

The document creator operates the input section 410 to start up application software to enter the output request information N5 in a specific form. The control section 430 transmits the output request information N5 and the location information N6 to the server 100 via the image forming apparatus 500.

Alternatively, as necessary, the document creator can transmit the output approval request information N2 from the mobile terminal 400 to the approver terminal 300 via the server 100. The document creator creates the output approval request information N2 using application software installed on the mobile terminal 400. The control section 430 transmits the output approval request information N2 to the server 100 using a VPN.

Figure 6:
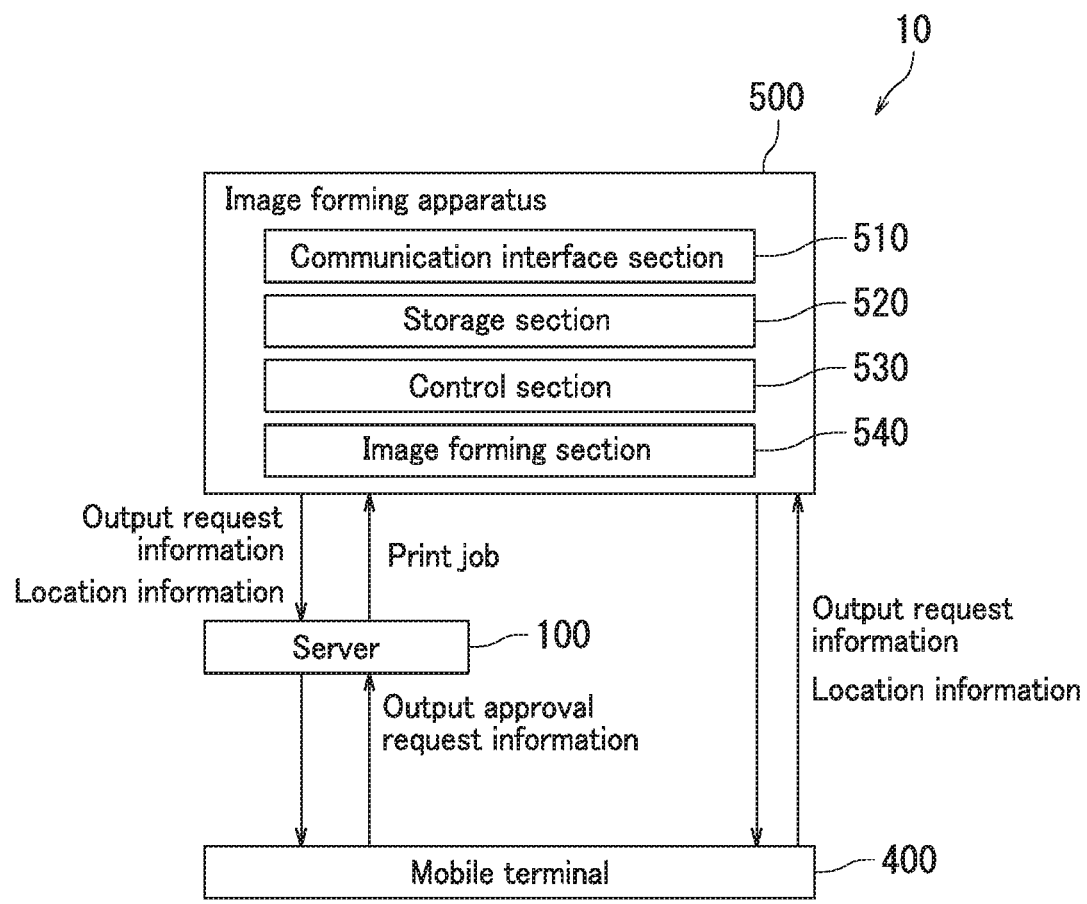
FIG. 6 is a block diagram illustrating part of configuration of the printing control system according to the embodiment of the present disclosure.

The following describes configuration of the image forming apparatus 500 in the printing control system 10 according to the present embodiment with reference to FIG. 6. FIG. 6 is a block diagram illustrating part of configuration of the printing control system 10. The image forming apparatus 500 includes a communication interface section 510, a storage section 520, a control section 530, and an image forming section 540. Like the server 100, the image forming apparatus 500 includes a CPU, ROM, RAM, and a HDD. The image forming apparatus 500 functions through the CPU executing a control program stored in the ROM or the HDD. The image forming apparatus 500 is for example a copier, a printer, or a multifunction peripheral.

The communication interface section 510 enables transmission and reception of various types of information to and from the server 100 and the mobile terminal 400 in accordance with instructions by the control section 530.

The control section 530 receives the output request information N5 and the location information N6 transmitted thereto from the mobile terminal 400 via the communication interface section 510. The control section 530 transmits the received output request information N5 and output approval information N6 to the server 100.

The control section 530 also receives the print job J transmitted thereto from the server 100 via the communication interface section 510. The storage section 520 stores the print job J transmitted from the server 100. The control section 530 transmits the received print job J to the image forming section 540 and causes the image forming section 540 to form (output) an image based on the document information W on the recording medium P (see FIG. 1).

Figure 7A:
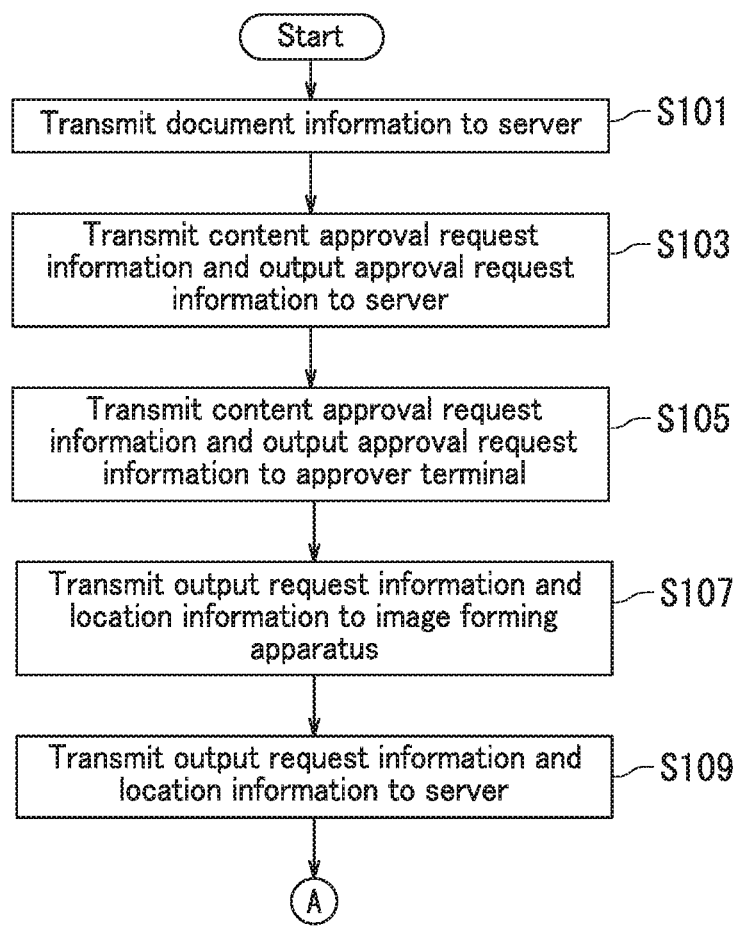
FIGS. 7A and 7B are a flowchart illustrating printing control processing in the printing control system according to the embodiment of the present disclosure.
Figure 7B:
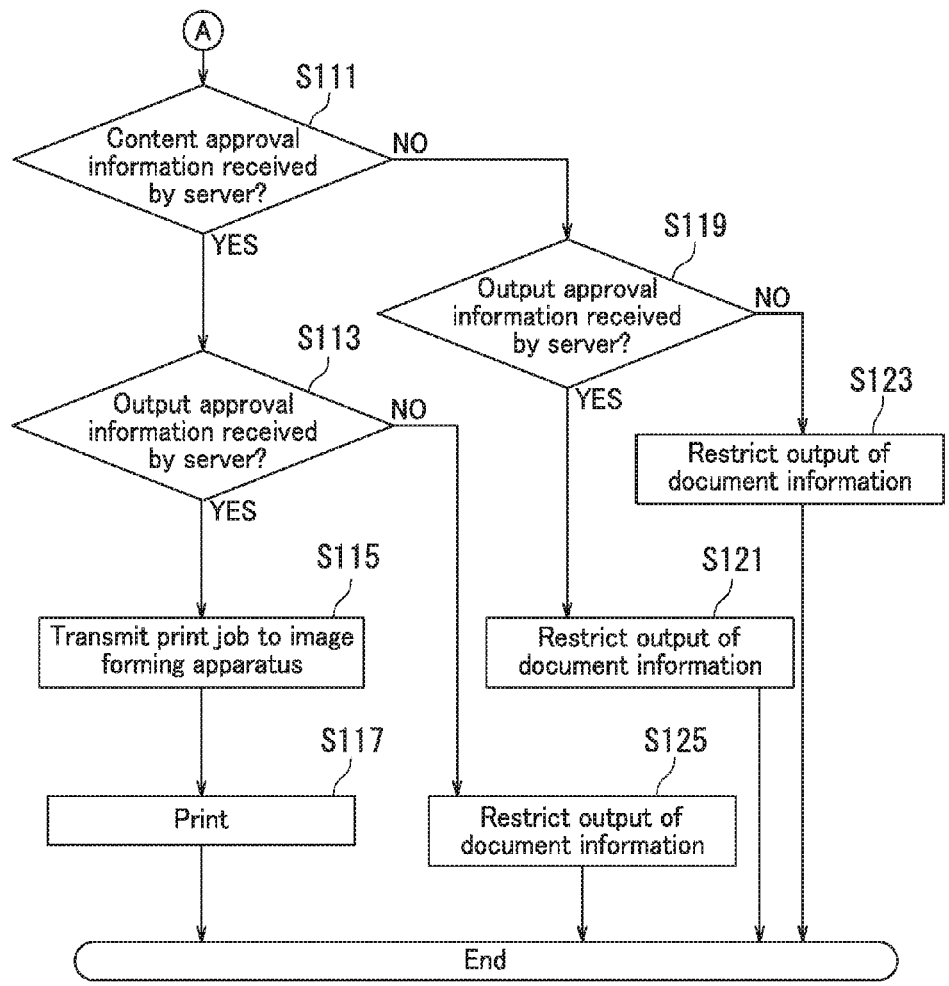

The following describes printing control processing in the printing control system 10 according to the present embodiment with reference to FIGS. 7A and 7B. FIGS. 7A and 7B are a flowchart illustrating the printing control processing in the printing control system 10.

In Step S101, the document creator terminal 200 transmits the document information W to the server 100. More specifically, the document creator creates the document information W using any type of application software installed on the document creator terminal 200. In response to the document creator's operation, the control section 240 of the document creator terminal 200 transmits the document information W to the server 100. The control section 120 of the server 100 stores the document information W transmitted from the document creator terminal 200 in the storage section 130 of the server 100. The printing control processing subsequently proceeds to Step S103.

Next, in Step S103, the document creator terminal 200 transmits the content approval request information N1 and the output approval request information N2 to the server 100. More specifically, the document creator creates the content approval request information N1 and the output approval request information N2 using application software installed on the document creator terminal 200. The control section 240 of the document creator terminal 200 transmits the content approval request information N1 and the output approval request information N2 to the server 100. The control section 120 of the server 100 stores the content approval request information N1 and the output approval request information N2 transmitted from the document creator terminal 200 in the storage section 130 of the server 100. The printing control processing subsequently proceeds to Step S105.

Next, in Step S105, the server 100 transmits the content approval request information N1 and the output approval request information N2 to the approver terminal 300. More specifically, the control section 120 of the server 100 transmits the content approval request information N1 and the output approval request information N2 received from the document creator terminal 200 to the approver terminal 300. The control section 340 of the approver terminal 300 receives and stores in the storage section 330 of the approver terminal 300 the content approval request information N1 and the output approval request information N2. Depending on the propriety of the content (for example, any type of report) of the document information W and the propriety of the output conditions (for example, image forming apparatus 500 of the document creator's company, any time of day), the approver determines whether or not to approve the content and the output conditions. In response to the approver's operation, the control section 340 of the approver terminal 300 transmits the content approval information N3 for the content approval request information N1 and the output approval information N4 for the output approval request information N2 to the server 100. The printing control processing subsequently proceeds to Step S107.

Next, in Step S107, the mobile terminal 400 transmits the output request information N5 and the location information N6 to an image forming apparatus 500. More specifically, the document creator creates the output request information N5 using application software installed on the mobile terminal 400. The control section 430 of the mobile terminal 400 transmits the output request information N5 and the location information N6 to the image forming apparatus 500. The control section 530 of the image forming apparatus 500 receives the output request information N5 and the location information N6 transmitted from the mobile terminal 400. The printing control processing subsequently proceeds to Step S109.

Next, in Step S109, the image forming apparatus 500 transmits the output request information N5 and the location information N6 to the server 100. More specifically, the control section 530 of the image forming apparatus 500 transmits to the server 100 the output request information N5 and the location information N6 transmitted from the mobile terminal 400. The control section 120 of the server 100 stores the transmitted output request information N5 and location information N6 in the storage section 130 of the server 100. The printing control processing subsequently proceeds to Step S111.

Next, when it is determined in Step S111 that the server 100 has received the content approval information N3 (Yes in Step S111), the printing control processing proceeds to Step S113. More specifically, in a situation in which the content approval information N3 has been transmitted from the approver terminal 300 to the server 100, the control section 120 of the server 100 stores the content approval information N3 in the storage section 130 of the server 100. The printing control processing subsequently proceeds to Step S113. In a situation in which the server 100 has not received the content approval information N3 from the approver terminal 300 (No in Step S111), the printing control processing proceeds to Step S119.

Next, when it is determined in Step S113 that the server 100 has received the output approval information N4 (Yes in Step S113), the printing control processing proceeds to Step S115. More specifically, in a situation in which the output approval information N4 has been transmitted from the approver terminal 300 to the server 100, the control section 120 of the server 100 stores the output approval information N4 in the storage section 130 of the server 100. The printing determination section 121 determines that the approval status is "content and output approved". The printing control processing subsequently proceeds to Step S115. In a situation in which the server 100 has not received the output approval information N4 from the approver terminal 300 (No in Step S113), the printing control processing proceeds to Step S125.

Next, in Step S115, the server 100 transmits the print job J to an image forming apparatus 500. More specifically, the printing determination section 121 determines to transmit the print job J to an image forming apparatus 500 according to the conditions included in the output conditions. In accordance with the determination result, the job generating section 122 generates the print job J based on the document information W. The job generating section 122 transmits the print job J to the permitted image forming apparatus 500. The printing control processing subsequently proceeds to Step S117.

Next, in Step S117, the image forming apparatus 500 performs printing of the document information W. More specifically, the control section 530 of the image forming apparatus 500 receives the print job J transmitted from the server 100 and stores the print job J in the storage section 520 of the image forming apparatus 500. The control section 530 of the image forming apparatus 500 transmits the received print job J to the image forming section 540 and causes the image forming section 540 to form (output) an image based on the document information W on the recording medium P. Thereafter, the printing control processing comes to an end.

When it is determined in Step S119 that the server 100 has received the output approval information N4 (Yes in Step S119), the printing control processing proceeds to Step S121. More specifically, Step S119 involves the same processing as Step S113 described above. However, since the server 100 has not received the content approval information N3 from the approver terminal 300, the printing determination section 121 determines that the approval status is "only output approved". The printing control processing subsequently proceeds to Step S121. In a situation in which the server 100 has not received the output approval information N4 from the approver terminal 300 (No in Step S119), the printing control processing proceeds to Step S123. More specifically, the printing determination section 121 determines that the approval status is "content and output unapproved". The printing control processing subsequently proceeds to Step S123.

Next, in Step S121, the server 100 restricts output of the document information W. More specifically, the printing determination section 121 determines to permit an image forming apparatus 500 to output the document information W on the condition that the image forming apparatus 500 is installed in a place specified by the restriction conditions. The image forming apparatus 500 installed in a place specified by the restriction conditions is for example an image forming apparatus 500 of the document creator's division. In accordance with the determination result, the job generating section 122 generates the job J based on the document information W. The job generating section 122 transmits the print job J to the permitted image forming apparatus 500. Thereafter, the same processing as in Step S117 is performed and the printing control processing comes to an end.

Next, in Step S123, the server 100 restricts output of the document information W. More specifically, Step S123 involves the same processing as Step S121 described above. Since the approval status is "content and output unapproved", the image forming apparatus 500 installed in a place specified by the restriction conditions is for example an image forming apparatus 500 of the document creator's team. Thereafter, the printing control processing comes to an end.

Next, in Step S125, the server 100 restricts output of the document information W. More specifically, Step S125 involves the same processing as Step S121 described above. Since the approval status is "only content approved", the image forming apparatus 500 installed in a place specified by the restriction conditions is for example an image forming apparatus 500 of the document creator's section/department. Thereafter, the printing control processing comes to an end.

Figure 8A:
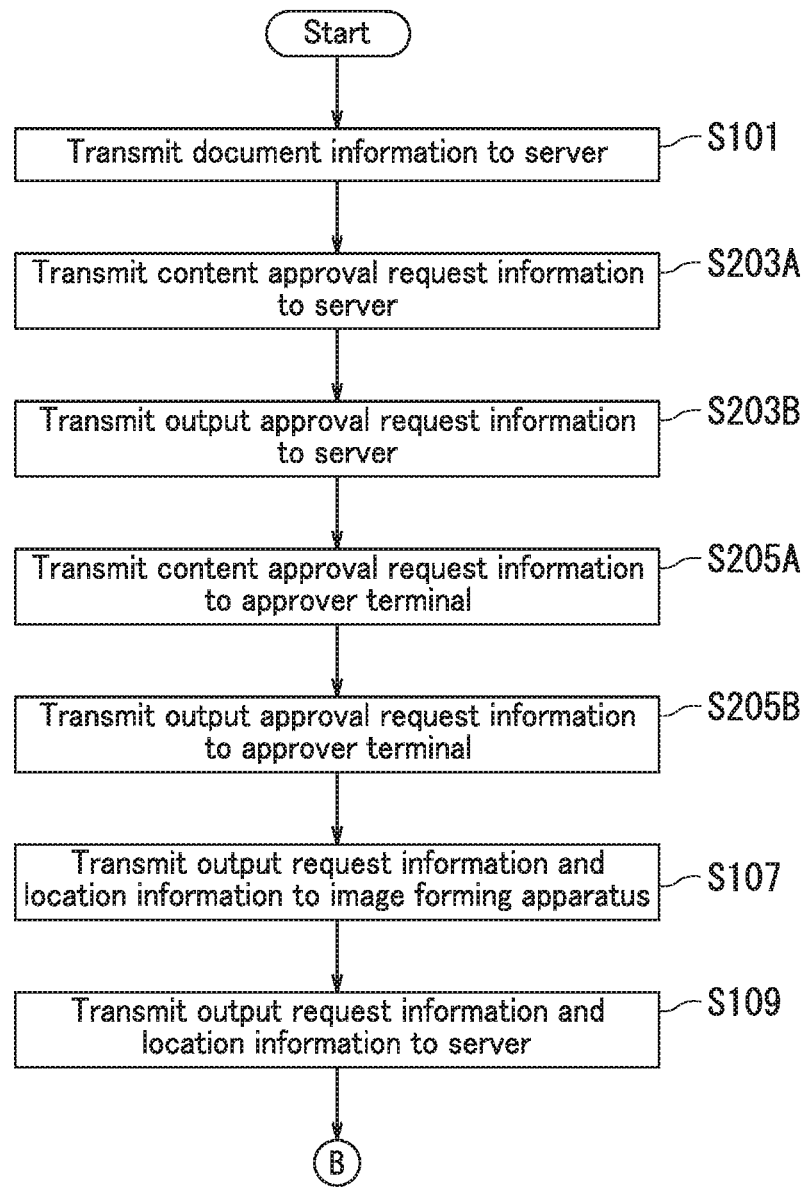
FIGS. 8A and 8B are a flowchart illustrating printing control processing in the printing control system according to the embodiment of the present disclosure.
Figure 8B:
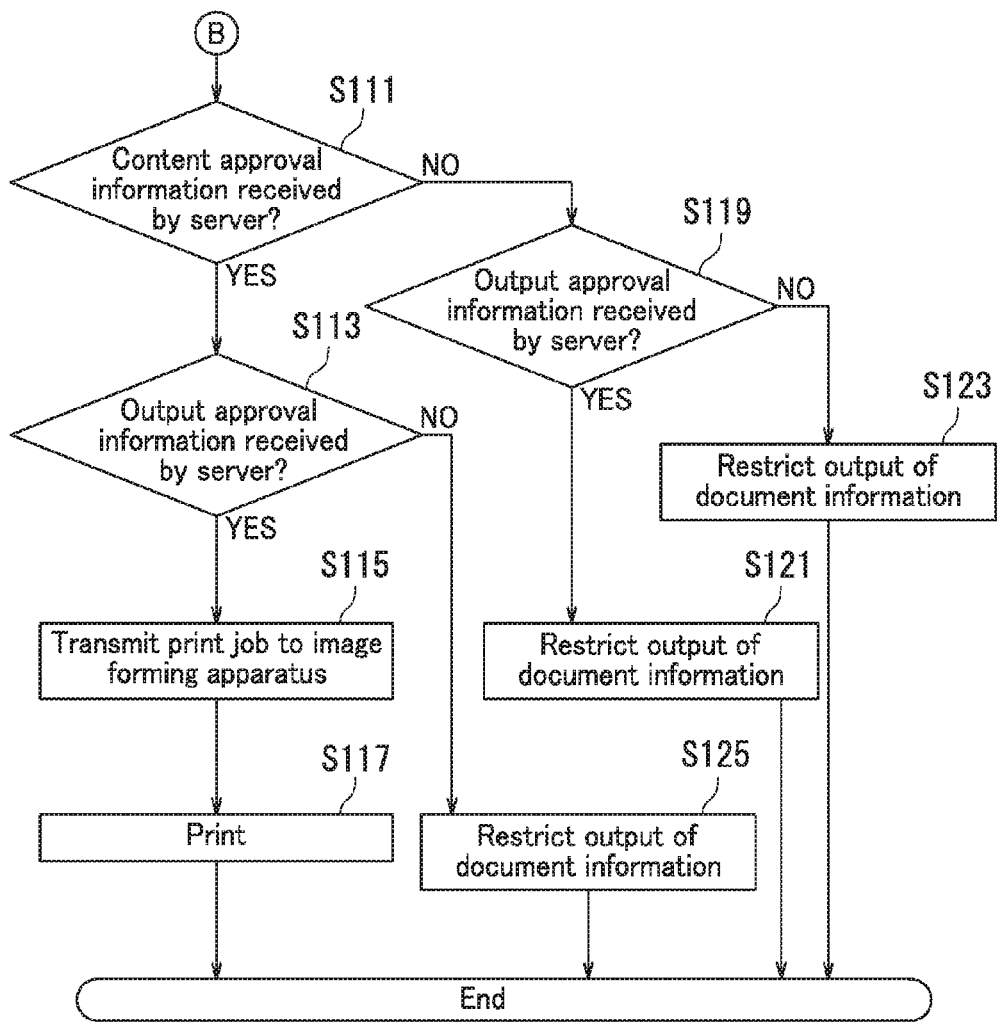

The following describes printing control processing in a situation in which the mobile terminal 400 transmits the output approval request information N2 to the approver terminal 300 via the server 100 with reference to FIGS. 8A and 8B. FIGS. 8A and 8B are a flowchart illustrating printing control processing in the printing control system 10.

Step S101 in FIG. 8A corresponds to Step S101 described with reference to FIG. 7A and involves the same printing control processing as in Step S101 in FIG. 7A. The printing control processing subsequently proceeds to Step S203A.

Next, in Step S203A, the document creator terminal 200 transmits the content approval request information N1 to the server 100. More specifically, the document creator creates the content approval request information N1 using application software installed on the document creator terminal 200. The control section 240 of the document creator terminal 200 transmits the content approval request information N1 to the server 100. The control section 120 of the server 100 stores the content approval request information N1 transmitted from the document creator terminal 200 in the storage section 130 of the server 100. The printing control processing subsequently proceeds to Step S203B.

Next, in Step S203B, the mobile terminal 400 transmits the output approval request information N2 to the server 100. More specifically, the document creator creates the output approval request information N2 using application software installed on the mobile terminal 400. The control section 430 of the mobile terminal 400 transmits the output approval request information N2 to the server 100 using a VPN. The control section 120 of the server 100 stores the output approval request information N2 transmitted from the mobile terminal 400 in the storage section 130 of the server 100. The printing control processing subsequently proceeds to Step S205A.

Next, in Step S205A, the server 100 transmits the content approval request information N1 to the approver terminal 300. More specifically, the control section 120 of the server 100 transmits the content approval request information N1 received from the document creator terminal 200 to the approver terminal 300. The control section 340 of the approver terminal 300 receives the content approval request information N1 and stores the content approval request information N1 in the storage section 330 of the approver terminal 300. The approver determines whether or not to approve the content of the document information W (for example, any type of report) depending on the propriety of the content. In response to the approver's operation, the control section 340 of the approver terminal 300 transmits the content approval information N3 for the content approval request information N1 to the server 100. The printing control processing subsequently proceeds to Step S205B.

Next, in Step S205B, the server 100 transmits the output approval request information N2 to the approver terminal 300. More specifically, the control section 120 of the server 100 transmits the output approval request information N2 received from the mobile terminal 400 to the approver terminal 300. The control section 340 of the approver terminal 300 receives the output approval request information N2 and stores the output approval request information N2 in the storage section 330 of the approver terminal 300. The approver determines whether or not to approve the output conditions (for example, image forming apparatus 500 of the document creator's company, any time of day) for the document information W depending on the propriety of the output conditions. In response to the approver's operation, the control section 340 of the approver terminal 300 transmits the output approval information N4 for the output approval request information N2 to the server 100. The printing control processing subsequently proceeds to Step S107.

Next, Step S107 to Step S125 illustrated in FIGS. 8A and 8B correspond to Step S107 to Step S125 described with reference to FIGS. 7A and 7B, respectively, and involve the same processing. After each of Step S117, Step S121, Step S123, and Step S125, the printing control processing comes to an end.

According to the present embodiment, as described above with reference to FIGS. 1 to 7B, the mobile terminal 400 transmits the output request information N5 and the location information N6 to the server 100 via the image forming apparatus 500. In accordance with the approval status of the document information W, the printing determination section 121 determines whether or not to transmit the print job J to the image forming apparatus 500 corresponding to the location information N6. Thus, output of the document information W can be restricted in accordance with the approval status of the document information W. As a result, it is possible to output the document information W according to usability while also maintaining security.

Furthermore, according to the present embodiment, the document creator terminal 200 can transmit the content approval request information N1 and the output approval request information N2 to the approver terminal 300 via the server 100. Thus, the approver can easily know that approval of the content of the document information W has been requested and that approval of the output conditions has been requested without regularly accessing the server 100. As a result, it is possible to reduce the time needed for approval of the document information W.

According to the present embodiment, as described with reference to FIGS. 5, and 8A and 8B, the mobile terminal 400 can transmit the output approval request information N2 to the approver terminal 300 via the server 100 using a VPN. Therefore, when the document creator visits a site (for example, another company) distant from the location of the document creator terminal 200, the document creator can output the document information W at the visited site as necessary even if the document creator does not transmit the output approval request information N2 from the document creator terminal 200 to the approver terminal 300 before the visit.

Figure 9:
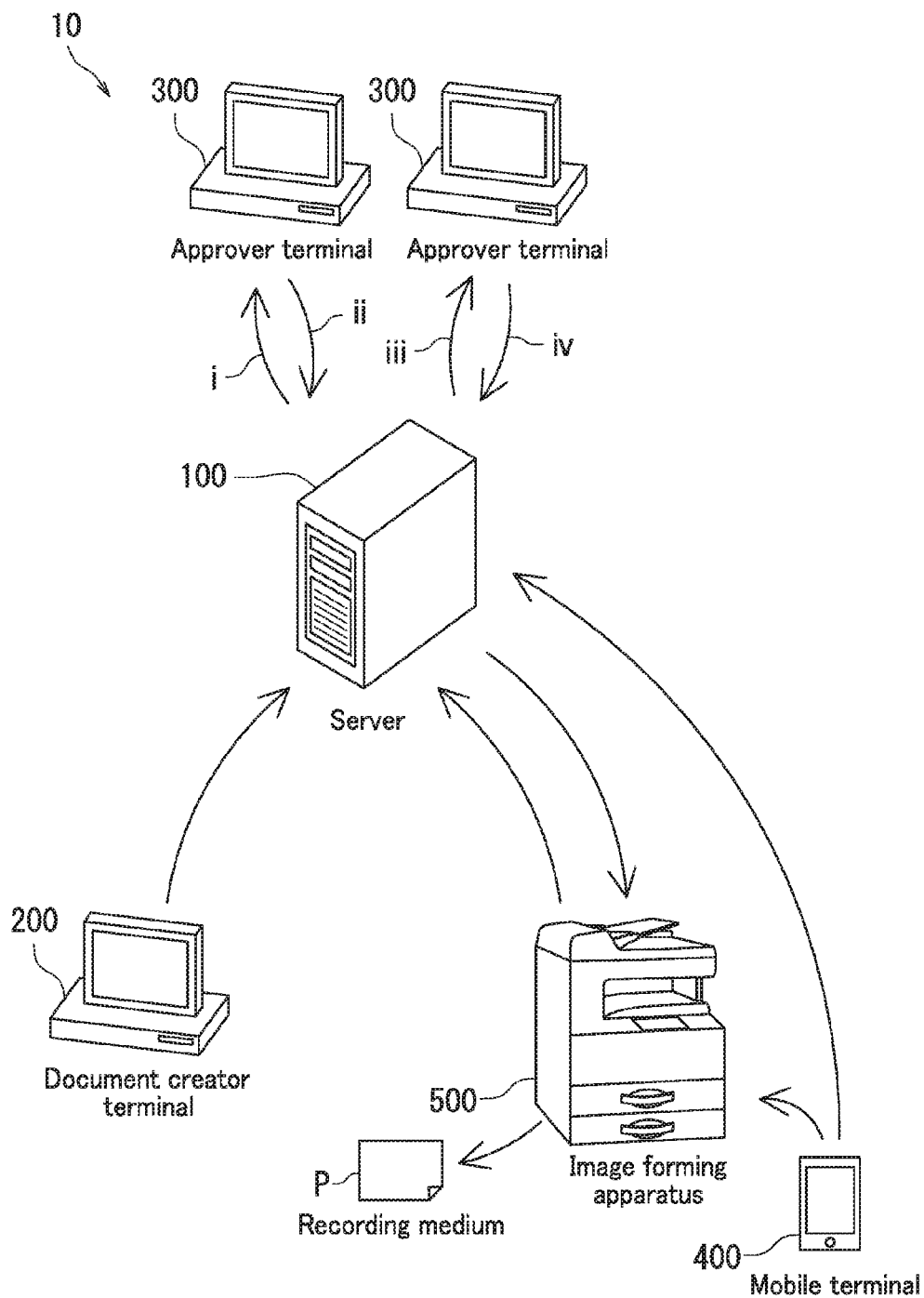
FIG. 9 is a diagram illustrating overview of a printing control system according to an embodiment of the present disclosure.

Note that the printing control system 10 may include a plurality of approver terminals 300 in an embodiment in which each of a plurality of approvers (for example, a department manager and a company president) has an approver terminal 300 at their desks in their offices. The following describes the embodiment in which the printing control system 10 includes two approver terminals 300 with reference to FIG. 9. FIG. 9 is a diagram illustrating overview of the printing control system 10. Note that configuration of the printing control system 10 including a plurality of approver terminals 300 and printing control processing therein are the same as in the embodiment described with reference to FIGS. 1 to 8B except for including a plurality of approver terminals 300. Therefore, description of aspects that are the same is omitted.

Various forms for various types of document information W are preinstalled on the document creator terminal 200. The various forms each have an approver field showing names of approvers and the number of approvers. The document creator for example creates the content approval request information N1 and the output approval request information N2 using a form including an approver field showing two approvers. As indicated by arrow i, the document creator terminal 200 transmits the content approval request information N1 and the output approval request information N2 to one of the approver terminals 300 used by the two approvers (for example, to the approver terminal 300 used by a department manager) via the server 100.

The approver to whom the information is transmitted first (hereinafter, referred to as "a first approver") determines whether or not to approve the content of the document information W and the output conditions depending on the propriety of the content and the propriety of the output conditions. The first approver is for example a person holding a lowest-level managerial position among the plurality of approvers. As indicated by arrow ii, the approver terminal 300 used by the first approver for example transmits the content approval information N3 and the output approval information N4 to the server 100.

The control section 120 of the server 100 receives and stores in the storage section 130 of the server 100 the content approval information N3 and the output approval information N4 transmitted from the approver terminal 300 used by the first approver. Thereafter, as indicated by arrow iii, the control section 120 of the server 100 transmits the content approval request information N1 and the output approval request information N2 to the other approver terminal 300 (for example, to the approver terminal 300 used by a company president).

The approver to whom the information is transmitted next after the first approver (hereinafter, referred to as "a second approver") determines whether or not to approve the content of the document information W and the output conditions in the same manner as by the first approver. The second approver is for example a person holding a higher-level managerial position than the first approver. As indicated by arrow iv, the control section 340 of the approver terminal 300 used by the second approver for example transmits the content approval information N3 and the output approval information N4 to the server 100 as in the case of the approver terminal 300 used by the first approver. The control section 120 of the server 100 receives and stores in the storage section 130 of the server 100 the content approval information N3 and the output approval information N4 transmitted from the approver terminal 300 used by the second approver.

In accordance with the approval status of the document information W, the printing determination section 121 determines whether or not to transmit the print job J to an image forming apparatus 500. The approval status varies depending on presence or absence of transmission of the content approval information N3 from each of the approver terminals 300 to the server 100 and depending on presence or absence of transmission of the output approval information N4 from each of the approver terminals 300 to the server 100. That is, the approval status described with reference FIGS. 1 to 8B ("content and output approved", "only content approved", "only output approved", or "content and output unapproved") is further broken down depending on presence or absence of approval by a final approver. The final approver refers to the last approver among the plurality of approvers. In the embodiment involving two approvers, the final approver refers to the second approver.

In a situation in which the approver terminal 300 used by the final approver has transmitted the content approval information N3 and the output approval information N4 to the server 100, the printing determination section 121 determines to transmit the print job J to an image forming apparatus 500 in accordance with the conditions included in the output conditions.

In a situation in which the approver terminal 300 used by the final approver has not transmitted at least one of the content approval information N3 and the output approval information N4 to the server 100, the printing determination section 121 determines to permit an image forming apparatus 500 to output the document information W on the condition that the image forming apparatus 500 is installed in a place specified by the restriction conditions set up for the respective approval statuses. Thus, the user can adjust the degree of enhancement of the security according to the approval status. For example, in a situation in which the approval status as a result of approval by the first approver is "content and output approved" and the approval status as a result of approval by the second approver is "content and output unapproved", the printing determination section 121 determines to permit an image forming apparatus 500 to output the document information W on the condition that the image forming apparatus 500 is an image forming apparatus 500 of the document creator's section/department.

Thus, the printing determination section 121 can determine whether or not to transmit the print job J to an image forming apparatus 500 in accordance with the approval status as a result of approval by a plurality of approvers. It is therefore possible to set up a wider variety of restriction conditions for output of the document information W in accordance with the approval status as a result of approval by a plurality of approvers.

Through the above, embodiments of the present disclosure have been described with reference to the drawings (FIGS. 1 to 9). However, the present disclosure is not limited to the above embodiments and may be implemented in various different forms that do not deviate from the essence of the present disclosure (for example, as described below in sections (1) and (2)). Elements of configuration disclosed in the above embodiments can be combined as appropriate in various different forms. For example, some of the elements of configuration in the embodiments may be omitted. Furthermore, elements of configuration in different embodiments may be combined as appropriate. The drawings schematically illustrate elements of configuration in order to facilitate understanding. Properties of the elements of configuration illustrated in the drawings such as thickness, length, and quantity may differ from reality in order to aid preparation of the drawings. Furthermore, properties of elements of configuration in the above embodiments such as quantity are merely examples that do not impose any particular limitations and can be altered in various ways to the extent that there is not substantial deviation from the effects of the present disclosure.

(1) Although the storage section 130 of the server 100 described with reference to FIGS. 1 to 9 stores the document information W transmitted from the document creator terminal 200, the present disclosure is not limited to such a configuration. For example, the storage section 130 may store the document information W input from a USB memory device via a USB port provided in a main body of the server 100.

(2) Although the mobile terminal 400 described with reference to FIGS. 1 to 9 transmits the output request information N5 and the location information N6 to the server 100 via an image forming apparatus 500, the present disclosure is not limited to such a configuration. For example, the mobile terminal 400 may transmit the output request information N5 and the location information N6 to the server 100 using a VPN without routing communications through an image forming apparatus 500. The server 100 may transmit the print job J to an image forming apparatus 500 closest to the location indicated by the location information N6.

What is claimed is:

1. A printing control system for controlling printing on a recording medium, comprising:
a server;
an approver terminal communicable with the server;
an image forming apparatus communicable with the server; and
a mobile terminal communicable with the image forming apparatus, wherein
the server includes a printing determination section and a storage section configured to store therein document information,
the mobile terminal transmits output request information and location information to the server via the image forming apparatus,
the output request information includes information requesting the server to transmit a print job based on the document information,
the location information includes information indicating a location of the mobile terminal,
upon the output request information and the location information being transmitted from the mobile terminal to the server via the image forming apparatus, the printing determination section determines whether or not to transmit the print job to the image forming apparatus corresponding to the location information in accordance with an approval status of the document information,
the approval status varies depending on presence or absence of transmission of content approval information from the approver terminal to the server and depending on presence or absence of transmission of output approval information from the approver terminal to the server, the content approval information approving content of the document information, the output approval information approving output conditions for output of an image based on the document information,
the printing control system further comprises a document creator terminal communicable with the server,
the document creator terminal:
transmits the document information to the server; and
transmits content approval request information and output approval request information to the approver terminal via the server,
the content approval request information includes information requesting approval of the content of the document information,
the output approval request information includes information indicating the output conditions and information requesting approval of the output conditions,
the approver terminal includes a notification section configured to notify that approval of the content of the document information has been requested and that approval of the output conditions has been requested, and
the approver terminal transmits the content approval information for the content approval request information and the output approval information for the output approval request information to the server.

2. The printing control system according to claim 1, wherein
the mobile terminal is communicable with the server and transmits the output approval request information to the approver terminal via the server.

3. A printing control system for controlling printing on a recording medium, comprising:
a server;
an approver terminal communicable with the server;
an image forming apparatus communicable with the server; and
a mobile terminal communicable with the image forming apparatus, wherein
the server includes a printing determination section and a storage section configured to store therein document information,
the mobile terminal transmits output request information and location information to the server via the image forming apparatus,
the output request information includes information requesting the server to transmit a print job based on the document information,
the location information includes information indicating a location of the mobile terminal,
upon the output request information and the location information being transmitted from the mobile terminal to the server via the image forming apparatus, the printing determination section determines whether or not to transmit the print job to the image forming apparatus corresponding to the location information in accordance with an approval status of the document information,
the approval status varies depending on presence or absence of transmission of content approval information from the approver terminal to the server and depending on presence or absence of transmission of output approval information from the approver terminal to the server, the content approval information approving content of the document information, the output approval information approving output conditions for output of an image based on the document information,
the printing control system further comprises a document creator terminal communicable with the server,
the mobile terminal is communicable with the server,
the document creator terminal:
transmits the document information to the server; and
transmits content approval request information to the approver terminal via the server,
the content approval request information includes information requesting approval of the content of the document information,
the mobile terminal transmits output approval request information to the approver terminal via the server,
the output approval request information includes information requesting approval of the output conditions,
the approver terminal includes a notification section configured to notify that approval of the content of the document information has been requested and that approval of the output conditions has been requested, and
the approver terminal transmits the content approval information for the content approval request information and the output approval information for the output approval request information to the server.

4. The printing control system according to claim 1, comprising
a plurality of the approver terminals, wherein the approval status varies depending on presence or absence of transmission of the content approval information from each of the approver terminals to the server and depending on presence or absence of transmission of the output approval information from each of the approver terminals to the server.

5. The printing control system according to claim 1, wherein
the output conditions include:
a condition specifying an installation place at which the document information is to be output and for which approval is sought, the installation place being a place in which the image forming apparatus is installed; and
a condition specifying a time at which the document information is to be output and for which approval is sought, and
the printing determination section:
determines to transmit the print job to the image forming apparatus in accordance with the conditions included in the output conditions in a situation in which the approver terminal has transmitted both the content approval information and the output approval information to the server; and
determines to transmit the print job to another image forming apparatus in an installation place different from the installation place specified by the output conditions in a situation in which the approver terminal has not transmitted at least one of the content approval information and the output approval information to the server.

6. The printing control system according to claim 5, wherein
the installation place specified by the output conditions is associated with administrator information indicating an administrator of the installation place, and
the installation place different from the installation place specified by the output conditions is associated with administrator information different from the administrator information associated with the installation place specified by the output conditions.

7. A printing control method implemented by a server communicable with an approver terminal and with an image forming apparatus, the method comprising:
the server storing document information;
the server receiving output request information and location information, the output request information requesting the server to transmit a print job based on the document information, the location information indicating a location of a mobile terminal that has transmitted the output request information; and
after the receiving of the output request information and the location information, the server determining whether or not to transmit the print job to the image forming apparatus corresponding to the location information in accordance with an approval status of the document information, wherein
the approval status varies depending on presence or absence of transmission of content approval information from the approver terminal to the server and depending on presence or absence of transmission of output approval information from the approver terminal to the server, the content approval information approving content of the document information, the output approval information approving output conditions for output of an image based on the document information, the server is further communicable with a document creator terminal,
the method further comprises:
the document creator terminal transmitting the document information to the server; and
the document creator terminal transmitting content approval request information and output approval request information to the approver terminal via the server,
the content approval request information includes information requesting approval of the content of the document information,
the output approval request information includes information indicating the output conditions and information requesting approval of the output conditions,
the approver terminal includes a notification section configured to notify that approval of the content of the document information has been requested and that approval of the output conditions has been requested, and
the method further comprises
the approver terminal transmitting the content approval information for the content approval request information and the output approval information for the output approval request information to the server.

8. The printing control system according to claim 3, comprising
a plurality of the approver terminals, wherein
the approval status varies depending on presence or absence of transmission of the content approval information from each of the approver terminals to the server and depending on presence or absence of transmission of the output approval information from each of the approver terminals to the server.

9. The printing control system according to claim 3, wherein
the output conditions include:
a condition specifying an installation place at which the document information is to be output and for which approval is sought, the installation place being a place in which the image forming apparatus is installed; and
a condition specifying a time at which the document information is to be output and for which approval is sought, and
the printing determination section:
determines to transmit the print job to the image forming apparatus in accordance with the conditions included in the output conditions in a situation in which the approver terminal has transmitted both the content approval information and the output approval information to the server; and
determines to transmit the print job to another image forming apparatus in an installation place different from the installation place specified by the output conditions in a situation in which the approver terminal has not transmitted at least one of the content approval information and the output approval information to the server.

10. The printing control system according to claim 9, wherein
the installation place specified by the output conditions is associated with administrator information indicating an administrator of the installation place, and
the installation place different from the installation place specified by the output conditions is associated with administrator information different from the administrator information associated with the installation place specified by the output conditions.

11. The printing control method according to claim 7, wherein the mobile terminal is communicable with the server, and the method further comprises the mobile terminal transmitting the output approval request information to the approver terminal via the server.

\* \* \* \* \*